United States Patent
Pollock et al.

(10) Patent No.: US 6,867,561 B1
(45) Date of Patent: Mar. 15, 2005

(54) ELECTRICAL MACHINE

(75) Inventors: Charles Pollock, Rutland (GB); Helen Geraldine Phyllis Pollock, Rutland (GB); Richard Thomas Walter, Towson, MD (US)

(73) Assignees: Black & Decker, Inc., Newark, NJ (US); University of Warwick, Warwichshire (GB)

( * ) Notice: Subject to any disclaimer, the term of this patent is extended or adjusted under 35 U.S.C. 154(b) by 0 days.

(21) Appl. No.: 10/048,509

(22) PCT Filed: Aug. 17, 2000

(86) PCT No.: PCT/GB00/03201
§ 371 (c)(1),
(2), (4) Date: Apr. 26, 2002

(87) PCT Pub. No.: WO01/15310
PCT Pub. Date: May 1, 2001

(30) Foreign Application Priority Data

Aug. 17, 1999 (GB) .............................. 9919345
Oct. 14, 1999 (GB) .............................. 9924203

(51) Int. Cl.$^7$ .............................. H02P 3/08; H02P 3/12
(52) U.S. Cl. ...................... 318/254; 318/367; 318/368; 318/381; 318/703
(58) Field of Search ................................ 318/254, 381, 318/367, 368, 362, 827, 837, 919, 138, 703, 712, 741, 746, 747, 757, 778, 794, 528, 536; 388/826, 827, 843, 849; 310/181

(56) References Cited

U.S. PATENT DOCUMENTS

| | | | | |
|---|---|---|---|---|
| 4,124,812 A | * | 11/1978 | Naito et al. ................... | 318/371 |
| 4,422,021 A | * | 12/1983 | Schwarz ...................... | 318/376 |
| 4,450,396 A | * | 5/1984 | Thornton ..................... | 318/721 |
| 4,468,599 A | * | 8/1984 | Berman et al. ............. | 318/362 |

(List continued on next page.)

FOREIGN PATENT DOCUMENTS

| | | |
|---|---|---|
| EP | 0 577 843 A | 1/1994 |
| GB | 2 159 672 A | 12/1985 |

(List continued on next page.)

OTHER PUBLICATIONS

British Search Report, Application No. GB 9919345.0, dated Dec. 20, 1999.

(List continued on next page.)

*Primary Examiner*—David Martin
*Assistant Examiner*—Patrick Miller
(74) *Attorney, Agent, or Firm*—Renner, Otto, Boisselle & Sklar, LLP

(57) ABSTRACT

An electrical machine comprises a rotor without windings, a stator having an armature winding 24, 25 and a field winding 10 for generating a magnetomotive force in a direction extending transversely of the magnetomotive force generated by the armature winding. An electronic circuit 40 is provided for controlling the current in the armature winding 24, 25 such that periods in which a magnetomotive force in one direction is associated with a first current pulse alternate with periods in which a magnetomotive force in the opposite direction is associated with a second current pulse. A position sensor is provided for monitoring the rotational position of the rotor and for supplying output signals at a rate dependent on the speed of rotation of the rotor. Furthermore a control system supplies control signals to the circuit 40 to control the current in the armature winding 24, 25 in response to the output signals. The control system uses a control signal of extended duration at the beginning of the first current pulse on start-up of the motor from rest as compared with the duration of the control signals produced over the remainder of the first current pulse during acceleration of the rotor. Such an arrangement produces efficient starting from rest, and enables control of acceleration, no-load speed, loaded torque-speed characteristics of the machine to be achieved with simple on-off control of armature and field switching devices, so that the control circuitry can be produced at relatively low cost. Simplification of the control circuitry is further ensured by the fact that such control can be effected without current sensing.

17 Claims, 8 Drawing Sheets

U.S. PATENT DOCUMENTS

| | | | | |
|---|---|---|---|---|
| 4,684,867 A | * | 8/1987 | Miller et al. | 318/701 |
| 4,935,708 A | | 6/1990 | Weldon et al. | 322/62 |
| 5,115,181 A | * | 5/1992 | Sood | 318/701 |
| 5,264,772 A | * | 11/1993 | Bahn | 318/701 |
| 5,355,069 A | * | 10/1994 | Bahn | 318/701 |
| 5,359,272 A | | 10/1994 | Liao | 318/732 |
| 5,424,624 A | | 6/1995 | Senak | 318/701 |
| 5,449,992 A | * | 9/1995 | Geiger et al. | 318/362 |
| 5,548,196 A | * | 8/1996 | Lim | 318/701 |
| 5,654,613 A | * | 8/1997 | Kim et al. | 318/139 |
| 5,677,586 A | * | 10/1997 | Horst | 310/103 |
| 5,689,164 A | * | 11/1997 | Hoft et al. | 318/701 |
| 5,739,662 A | | 4/1998 | Li | 318/701 |
| 5,764,007 A | * | 6/1998 | Jones | 318/109 |
| 5,861,724 A | * | 1/1999 | Ackerson | 318/376 |
| 6,013,993 A | * | 1/2000 | Barbisch | 318/379 |
| 6,014,001 A | * | 1/2000 | Guinet | 318/701 |
| 6,081,084 A | * | 6/2000 | Crecelius | 318/254 |
| 6,104,155 A | * | 8/2000 | Rosa | 318/381 |
| 6,181,539 B1 | * | 1/2001 | Maejima et al. | 361/22 |
| 6,285,104 B1 | * | 9/2001 | Nashiki | 310/184 |
| 6,566,839 B2 | * | 5/2003 | DaSilva et al. | 318/703 |
| 6,646,406 B1 | * | 11/2003 | Pollock et al. | 318/599 |
| 6,734,646 B2 | * | 5/2004 | Aiello et al. | 318/254 |

FOREIGN PATENT DOCUMENTS

| | | | | |
|---|---|---|---|---|
| GB | 2 194 693 A | | 3/1988 | |
| GB | 2 244 571 A | | 12/1991 | |
| GB | 2275836 A | * | 9/1994 | H02P/7/00 |
| JP | 04351490 A | * | 12/1992 | H02P/7/00 |
| SU | 1406697 A1 | | 6/1988 | |
| WO | 98/01942 | | 1/1998 | |
| WO | 98/05112 | | 2/1998 | |
| WO | WO 9805112 A1 | * | 2/1998 | H02K/19/06 |

OTHER PUBLICATIONS

British Search Report, Application No. GB 9924203.4, dated Mar. 6, 2000.

British Search Report, Application No. GB 9924203.4, dated Jun. 20, 2000.

British Search Report, Application No. GB 9924203.3, dated Jun. 15, 2000.

British Search Report, Application No. GB 9924203.4, dated Jun. 15, 2000.

British Search Report, Application No. GB 9924203.4, dated Jun. 14, 2000.

Suriano, Jr. et al.; "Variable Reluctance Motor Structures for Low-Speed Operation"; IEE Transactions on Industry Applications, US, IEEE Inc. New York, vol. 32, No. 2, Mar. 1, 1996, pp. 345–353, XP000591612 ISSN: 0093-9994.

* cited by examiner

ELECTRICAL MACHINE

Reference is also made to the Applicants' copending Applications Nos. PCT/GB00/03197, PCT/GB00/03213 and PCT/GB00/03214 the disclosures of which are incorporated herein by reference.

This invention relates to electrical machines, and is concerned more particularly, but not exclusively, with electric motors.

FIGS. 1a and 1b shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore other advantages are provided because there are no conductors on the rotor and highest permanent magnets are not required.

The symbols + and − in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that highly efficient utilisation of the electrical circuit is not possible with such a motor.

By contrast a fully pitched flux-switching variable reluctance motor, as described by J.D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIGS. 2a and 2b (in which the same reference numerals are used to denote like parts as in FIGS. 1a and 1b) comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost, J.R. Surano and C-M Ong, "Variable Reluctance Motor Structures for Low-Speed Operation", IEEE Transactions on Industry Applications, Vol.32, No.2, March/April 1996, pp 808–815 and UK Patent No. 2262843 also disclose fully pitched variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

WO 98/05112 discloses a fully pitched flux-switching motor having a four-pole stator 2 which, as shown diagrammatically in FIG. 3a, is provided with a field winding 10 and an armature winding 11 each of which is split into two coils 22 and 23 or 24 and 25 closely coupled (with a coupling which is substantially independent of rotor position) and wound so that diametrically opposite portions of both coils are disposed within diametrically opposite stator slots. FIG. 3b shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite direction as a result of the opposite winding of the coils. Switches 28 and 29, which may comprise field effect transistors or thyristors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used. A similar arrangement may be provided in an electrical alternator.

GB 215672A discloses a variable reluctance machine incorporating a residual magnetic energy recovery arrangement. This arrangement incorporates a dump capacitor which is charged by the freewheeling current of each phase and from which the excess energy is bled away to a d.c. source by way of a d.c. link capacitor.

The simplifications in the circuitry introduced by WO 98/05112 enable simple and low cost electronic machine control, but reduce the flexibility of the machine to be controlled under rapid acceleration or deceleration, as well as reducing the control of speed under load. It is an object of this invention to provide an electrical machine which has simple control circuitry but can also achieve high performance. According to the present invention there is provided an electrical machine comprising a rotor without windings, a stator having an armature winding and field magnet means for generating a magnetomotive force in a direction extending trasversely of the magnetomotive force generated by the armature winding, and circuit means for controlling the current in the armature winding such that periods in which a magnetomotive force in one direction is associated with a first current pulse alternate with periods in which a magnetomotive force in the opposite direction is associated with a second current pulse, the circuit means incorporating principal terminals and capacitance means including a first capacitance coupled between one of the principal terminals and an end of the armature winding, characterised in that the capacitance means further including a second capacitance across the principal terminals having a substantially larger capacitance value than the first capacitance, the first capacitance having a capacitance value such that the voltage across the first capacitance is capable of rising above the voltage across the second capacitance to boost the voltage initialising the armature current at the start of each current pulse.

This provides a particularly advantageous voltage boosting effect which allows a voltage to be applied to increase the armature current which is in excess of the available supply voltage. In this manner the armature current can be established more rapidly, and this may be particularly beneficial in increasing the efficiency at high speeds as it allows the degree of advance of any position sensor to be reduced.

Whilst such an arrangement is particularly effective in a machine in which armature and field windings are connected in series, the arrangement may also be used machine in which armature and field windings are connected in parallel or even one in which a permanent magnet is provided in place of the field winding.

Preferred embodiments of the invention allow control of acceleration, no-load speed, loaded torque-speed characteristics and braking of the machine to be achieved with simple on/off control of armature and field switching devices, so that the appropriate control circuitry can be produced at relatively low cost. Simplification of the control circuitry may be further assured by effecting such control without current sensing.

In order that the invention may be more fully understood, reference will now be made, by way of example, to the accompanying drawings, in which.

Figure 1A:
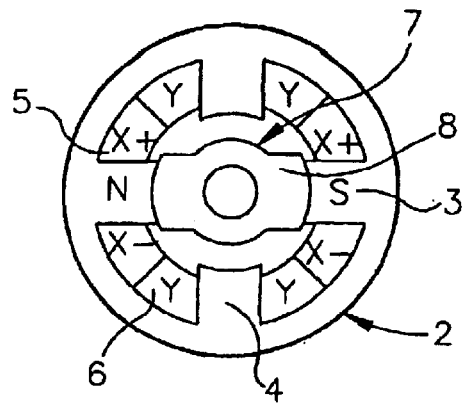
FIGS. 1a and 1b are explanatory diagrams showing a conventional two-phase variable reluctance motor, with the two excitation modes being shown in FIGS. 1a and 1b.
Figure 1B:
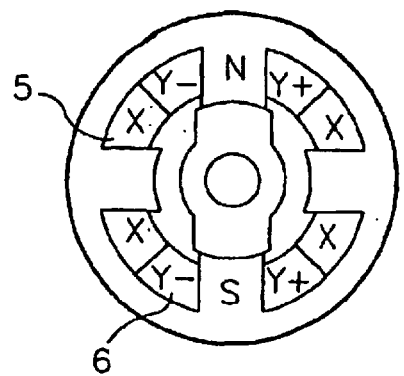
Figure 2A:
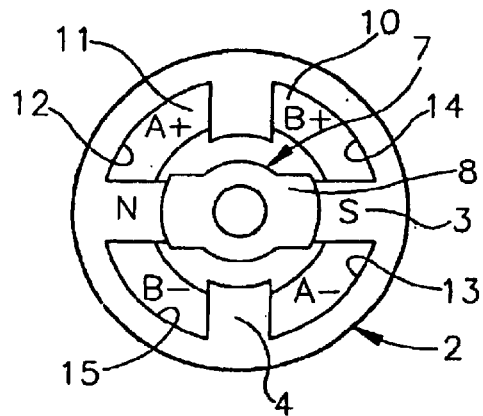
FIGS. 2a and 2b are explanatory diagrams showing a flux-switching motor, with the two excitation modes being shown in FIGS. 2a and 2b.
Figure 2B:
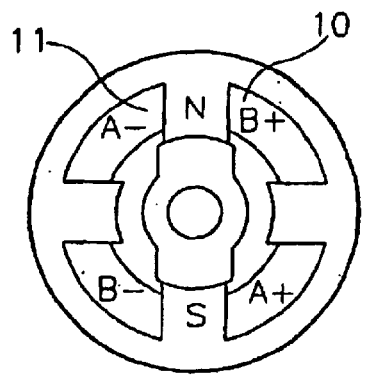
Figure 3A:
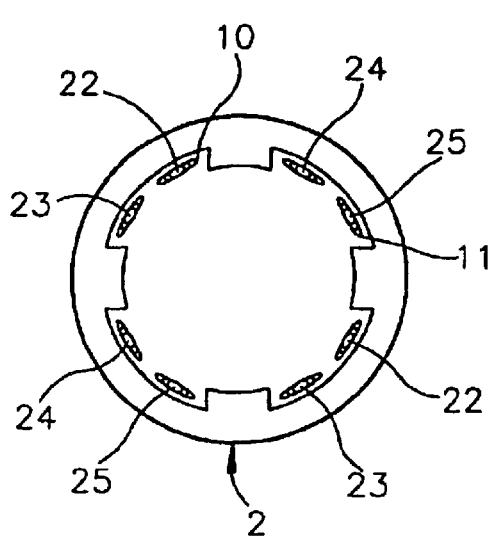
FIGS. 3a and 3b are explanatory diagrams showing the stator windings for a flux-switching motor as disclosed in WO 98/05112.
Figure 3B:
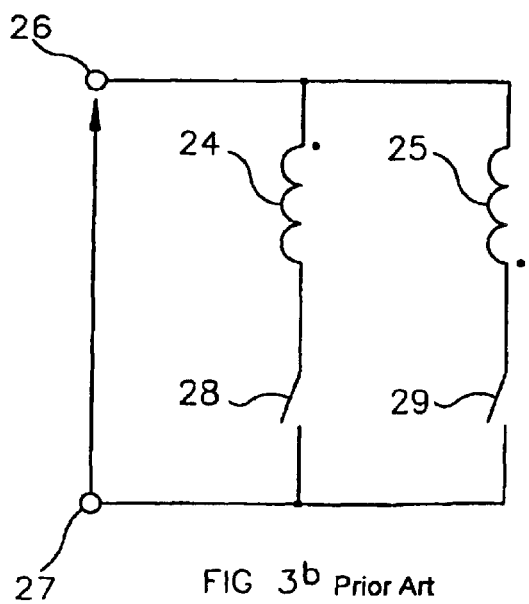
Figure 4:
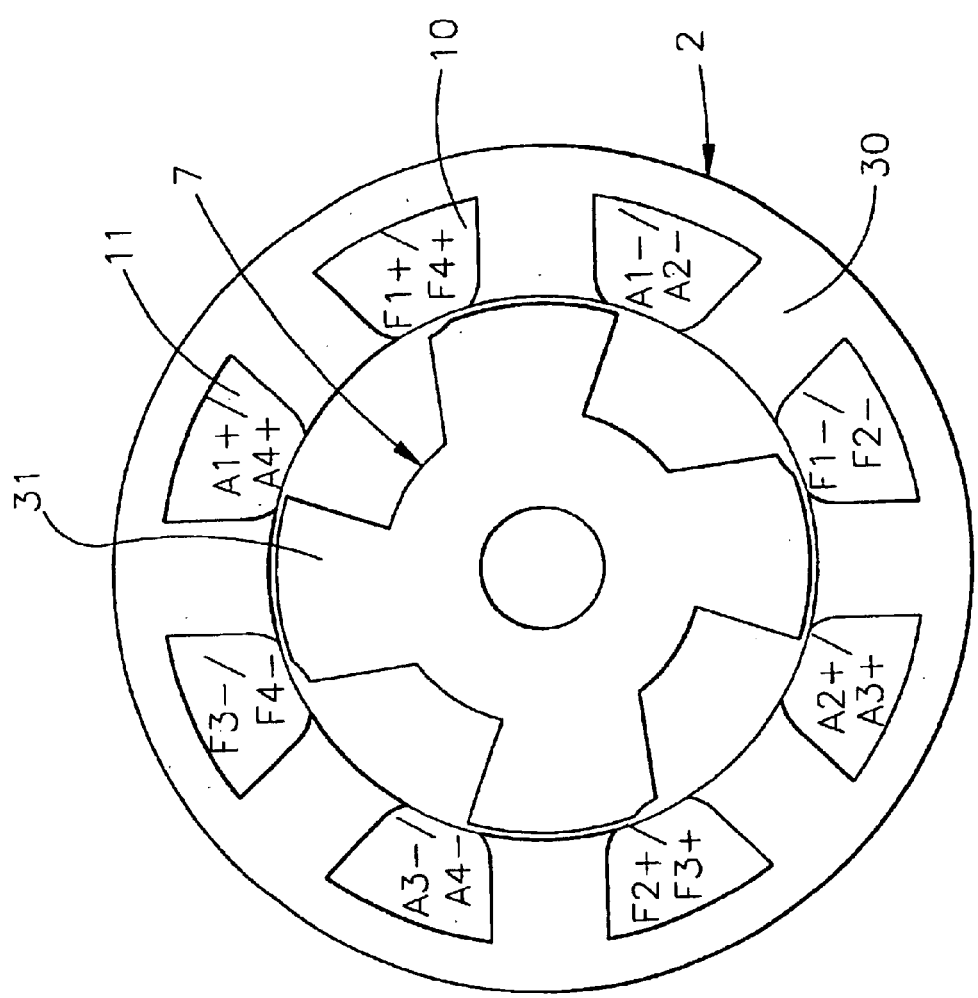
FIG. 4 is a diagram of a flux-switching motor having an 8-pole stator and a 4pole rotor.

The following description of an embodiment of the invention is given with reference to a flux-switching variable reluctance series motor having a stator 2 provided with eight inwardly directed salient poles 30 and a rotor 7 having four outwardly directed salient poles 31 without windings, as shown in FIG. 4. The stator 2 is provided with a field winding 10 and an armature winding II connected in a series configuration. The armature winding II and the field winding 10 comprise four armature winding parts A1, A2, A3 and A4 and four field winding parts F1, F2, F3 and F4 connected in series or in parallel (or any combination of series and parallel), each armature winding part being split into two coils which are closely magnetically coupled and wound so that diametrically opposite portions of the coils are disposed within two stator slots which are separated by a field winding slot. The armature coils are wound in opposite directions and may be bifilar wound where appropriate. In FIG. 4 the symbols + and − show the directions of current flow in the windings in one mode of excitation, and it will be understood that, in the alternate mode of excitation, the direction of current flow in the armature windings is reversed whereas the direction of current flow in the field windings is unchanged.

Figure 5:
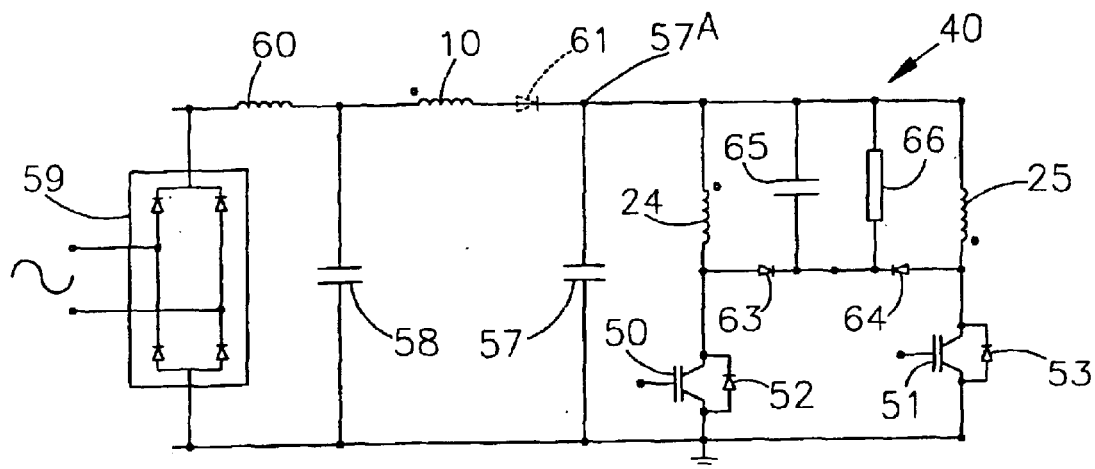
FIGS. 5, 6 and 7 are circuit diagrams showing different circuit arrangements for energising the field and armature windings of such a motor.

FIG. 5 shows an energisation circuit 40 for supplying current to the field winding 10 and the closely coupled armature coils 24 and 25 (each being considered as the combination of the coils of the four armature winding parts A1, A2, A3 and A4 of FIG. 4), where the field winding 10 is connected in series with the electrical supply to the circuit. The circuit 40 is supplied from an alternating current source by way of a rectifier bridge 59. A switching control circuit comprising two IGBT'S 50 and 51 (or MOSFET's ) is provided to supply current alternately to the armature coils 24 and 25 so as to provide the required magnetomotive forces acting in opposite directions to rotate the rotor. Each IGBT 50 or 51 includes an integral freewheeling diode 52 or 53 so that, as each IGBT is turned off, the stored magnetic energy in the corresponding coil is coupled to the other coil and flows back through the freewheeling diode of the other IGBT. Furthermore the ends of the armature coils 24 and 25 are connected by diodes 63 and 64 to a snubber capacitor 65 which charges to a voltage above the supply rail Voltage. The snubber capacitor 65 is discharged by the parallel resistor 66 so as to dump the energy stored in the snubber capacitor 65 from the imperfect switching process. The snubber capacitor 65 is provided to capture energy not transferred to the other armature coil when one of the armature coils is switched off by its respective switching device.

The additional snubber circuit formed by the components 63, 64, 65 and 66 is particularly important when insulated gate bipolar transistors (IGBT's) are used as the switching devices. IGBT's are easily damaged by device overvoltage, and the snubber circuit is used to contain the voltages occurring in the circuit to a level less than the voltage rating of the IGBT's. When MOSFET's are used as in FIG. 5, the snubber circuit can be dispensed with if the MOSFET's are chosen to provide an inherent voltage clamp as they enter a breakdown (avalanche) mode above their rated voltage. This breakdown mode absorbs the uncoupled magnetic energy associated with the imperfect coupling of the armature windings with one another. Provided that adequate heat dissipation is available the MOSFET's will not suffer any damage through this process, and the complexity and cost of the snubber circuit is not therefore required.

A capacitor 57 is connected to the interconnection point between the field winding 10 and the armature coils 24, 25 so as to allow the field current to continue to flow as the energy from the armature winding is returned back to the capacitor 57 through one of the diodes 52 or 53. A further capacitor 58 is connected across the output of the rectifier bridge 59, and an optional inductor 60 is connected in series with the output of the rectifier bridge 59, so as to filter the supply to the circuit. As shown in broken lines, it is also possible to provide a diode 61 in series with the field winding 10 to prevent the current in the field winding 10 reversing when the capacitor 57 is charged to a voltage above the supply voltage on the capacitor 58. However the diode 61 can be omitted if required. The rectifier bridge 59 (and optionally the capacitor 58 and inductor 60) may be replaced by a battery or other form of d.c. supply without departing from the scope of the invention.

Figure 6:
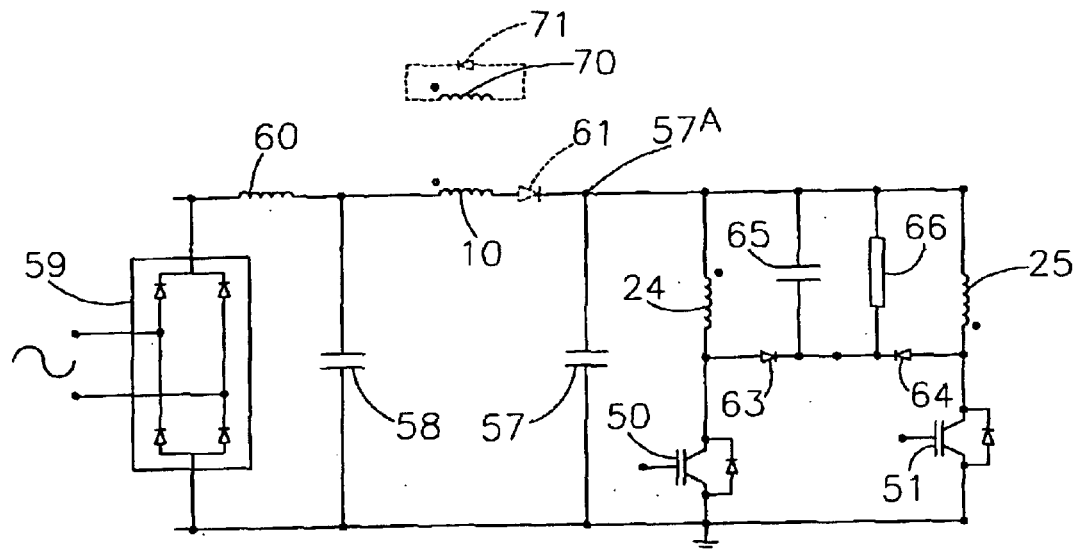

FIG. 6 shows a modification of such a circuit in accordance with the invention in which a secondary field winding 70 is closely coupled to the main field winding 10, and a diode 71 is connected to effectively short circuit the secondary field winding 70. Induced currents are caused to flow in the secondary field winding 70 in such a way as to limit variation in the field flux due to changes in reluctance and armature excitation.

This arrangement also offers some reduction in the level of the ripple current in the main field winding 10. The diode 71 in series with the secondary field winding 70 limits the current flow in the winding 70 to the direction which aids the main field winding 10 whilst still offering some reduction in the ripple current. It has been shown experimentally that such an arrangement is capable of reducing input current ripple whilst increasing the power delivered by the motor for a given armature current. A diode 61 may again be optionally provided in series with the main field winding 10.

Figure 7:
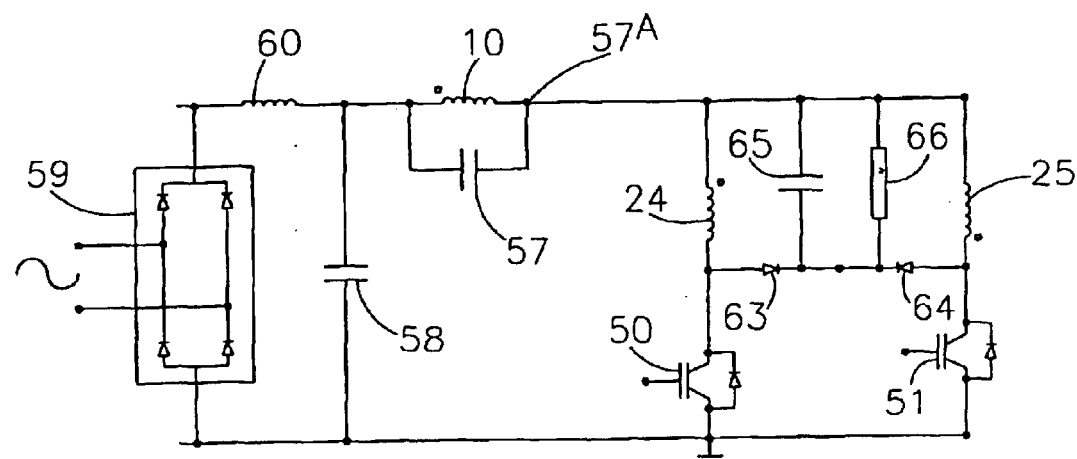

FIG. 7 shows another modification of the energisation circuit in which the capacitor 57 is connected in parallel with the field winding 10. This has very little effect on the electrical performance of the motor, but enables the voltage rating of the capacitor 57 to be reduced by the value of the supply voltage, thus providing a cost saving.

It is advantageous for the values of the capacitors 57 and 58 to be chosen so as to optimise the efficiency of the motor. The value of the capacitor 58 should be chosen to satisfy the requirements of supply filtering. In some motor applications, such as battery supplied motors, it may not be necessary to provide such a capacitor, but it is usual to provide a capacitance of several hundred microfarads at this part of the circuit in motors having a.c. supplies.

In accordance with the invention, the capacitance of the capacitor 57 is considerably less than the capacitance of the capacitor 58 so that the voltage across the capacitor 57 is allowed to vary within each motor operating cycle. When one of the armature switches is turned on, the current drawn by the armature winding will cause the capacitor 57 to discharge to a voltage below the voltage on the capacitor 58. This allows the field current to increase in the required manner such that the motor is supplied with an appropriate level of field current and armature current. When the armature switch is turned off, the current transfers to the other coil 24 or 25 and flows through the diode 52 or 53 back to the capacitor 57. In the circuits of FIGS. 5, 6 and 7, this causes the voltage at the node 57A to rise above the level of the supply voltage on the capacitor 58. Meanwhile the current flowing in the field winding 10 continues to flow, thereby further increasing the voltage at the node 57A. When the time comes to turn on the second armature switch, the voltage available to increase the armature current will be in excess of the available supply voltage such that the current in the armature winding can be established more rapidly. This is particularly beneficial at high speeds and allows the degree of advance of the position sensor to be reduced. This improves the efficiency of the motor.

In practical tests a value of 470 $\mu$F was used for the capacitor 58 and a value of between 5 and 10 $\mu$F was used for the capacitor 57 in a 3 kW motor running from a 240 V ac. supply. At full load and at a speed of 15,000 rpm the voltage at the positive end of the armature winding was seen to dip to 100 V and rise to 450 V relative to an average d.c. supply voltage of 250 V on the capacitor 58. A smaller motor with less armature current would use a smaller capacitor to achieve the same extent of voltage boosting. Conversely a lower speed motor would require a larger capacitor. Generally it is considered that an advantageous effect will be achieved if the capacitor values are chosen such that the voltage level is caused to rise or fall by a percentage in the range of 10–90% of its average value, preferably in the range of 30–80% of its average value.

Figure 8:
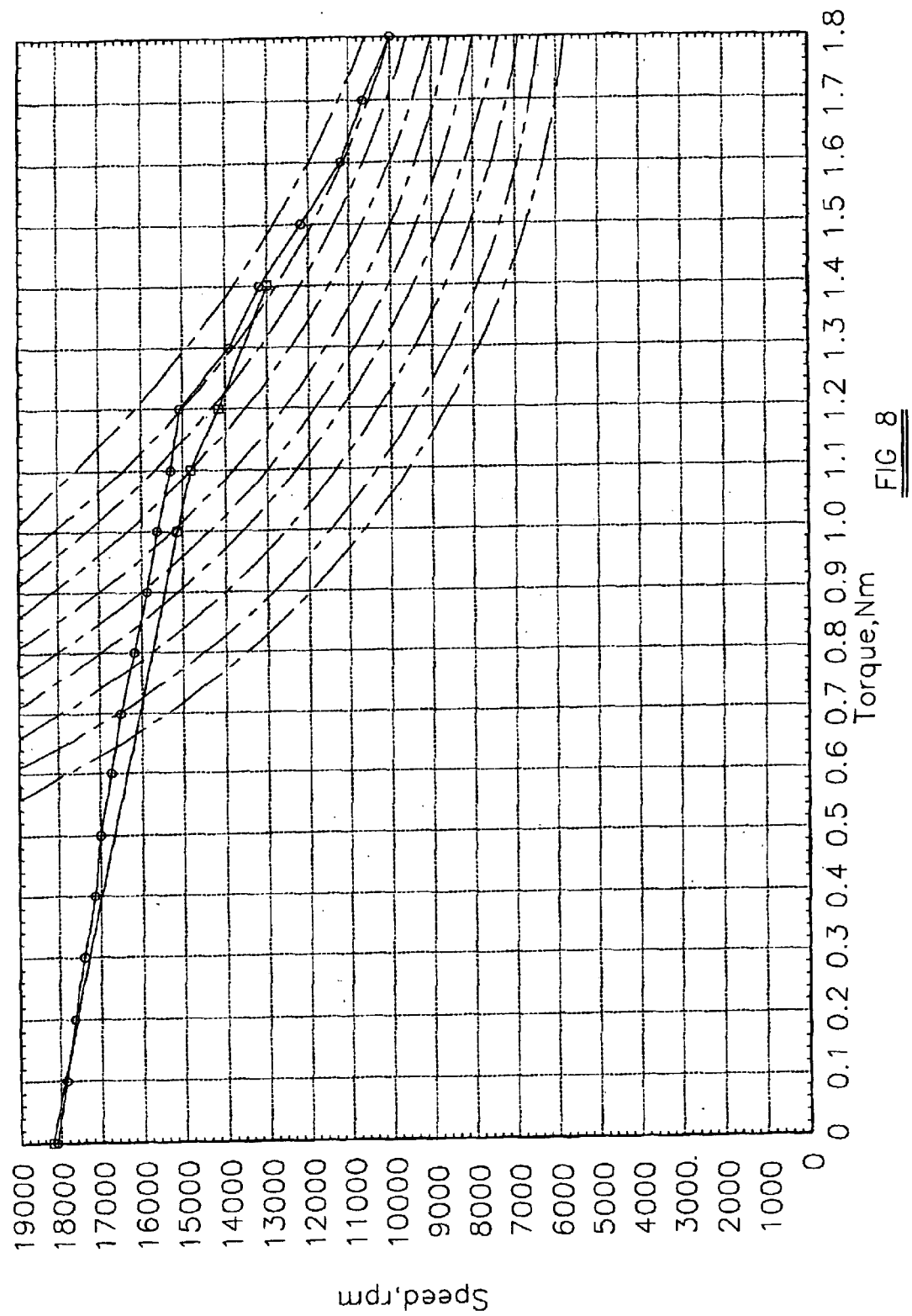
FIG. 8 is a graph showing different torque-speed curves obtained with such a motor, depending on the values of the capacitances used and the degree of advance of the rotor position sensor.

FIG. 8 is a graph of the torque against speed for such a motor showing torquespeed curves for three motor arrangements in which the field winding has 128 turns and the armature winding has 68 turns, and the broken lines indicate power out. In the first case (corresponding to the solid curve marked by circles)the degree of advance of the position sensor is 110 and a large value capacitor 58 of capacitance 3,300 $\mu$F and a large value capacitor 57 of capacitance 3,000 $\mu$F are used, whereas in the other two cases (corresponding to the solid curves marked by black and white squares respectively) the capacitor 58 has a value of 470 $\mu$F and the capacitor 57 has a relatively small value of capacitance of 7.5 $\mu$F, the degree of advance of the position sensor being 7° and 5° respectively in the two cases. It will be appreciated that, in all three cases, the performance is similar, and this shows that it is possible to provide similar electrical performance using a lesser degree of position sensor advance where optimum values for the capacitors 57 and 58 are chosen. This enables the efficiency of the motor to be increased since the motor can operate adequately with a lesser degree of position sensor advance.

Figure 9:
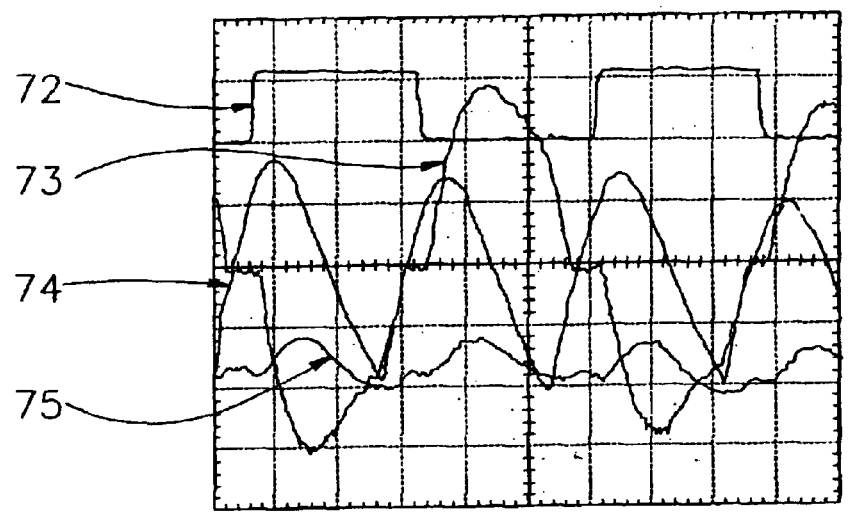
FIG. 9 is a timing diagram showing the current waveforms in operation of such a motor.

FIG. 9 is a timing diagram showing the current and voltage waveforms, where reference numeral 72 denotes the output from the position sensor, 73 denotes the armature current, 74 denotes the voltage at the node 57A relative to ground, and 75 denotes the field current. It will be seen from this timing diagram that the armature current 73 alternates between positive and negative values depending on which armature switch is turned on, with brief intermediate periods of zero current when neither switch is turned on. Furthermore the voltage at the node 57A reaches a maximum shortly after turning on of each armature switch, and reaches a minimum on turning off of the armature switch in time for charging of the capacitor 57 by the falling armature current.

These waveforms were measured with a motor having position sensor advance of 7° and a capacitor 57 of a value 7.5 v at a torque of 1.4 Nm and a rotor speed of about 14,000 rpm. The voltage on the capacitor 57 has a maximum of approximately 450 V and a minimum of approximately 100 V.

At initial start-up of such a motor, special measures must be taken to ensure correct starting. The Applicants'co-pending Application No. PCT/GB00/03197 discloses a special starting procedure using pulse width modulation for a motor having a field winding connected in a shunt or parallel configuration, this procedure involving introducing a time delay in the production of each control signal in an initial start-up period as compared with the production of control signals over subsequent cycles of rotation during acceleration of the rotor. However such a pulse width modulation method has been found to be ineffective in starting a motor of the type having its field winding in a series configuration. This is because the voltage on the capacitor 57 increases during chopping in such a pulse width modulation method and no significant current is drawn through the series field winding. In this case the armature excitation alone is not sufficient to start the motor.

A number of different methods have been evaluated for staring such a motor, including single pulse and pulse width modulation methods (differing frequencies and duty cycles). However it has been concluded that single pulse methods lead to excessively large currents at low speed forcing the pulses to be too short to be effective. Furthermore pulse width modulation methods, although initially considered more promising, quickly lead to excessive snubber voltages being produced. Such excessive snubber voltages are caused by build-up of energy in the capacitor 57 which in turn lifts the armature supply voltage on which the snubber voltage is superimposed. Furthermore this build-up of armature voltage during pulse width modulation reduces the field current flowing and thus reduces the initial torque.

Figure 10:
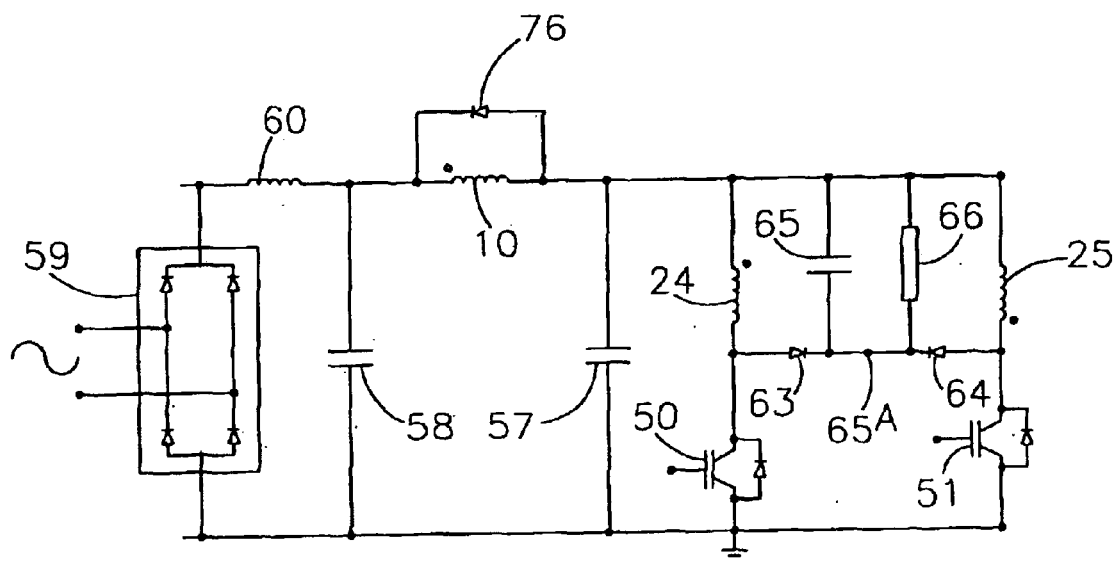
FIGS. 10, 11, 12 and 13 are circuit diagrams showing further circuit arrangements for energising the field and armature windings of such a motor.

Accordingly a flirter modification to the circuit is proposed where high rates of acceleration are required in which a diode 76 is connected in parallel with the field winding 10, as shown in FIG. 10, in order to ensure that the voltage across the capacitor 57 cannot exceed the voltage on the capacitor 58 during the start-up process.

Such an arrangement has been shown to prevent excessive voltage build-up on the capacitor 57, which could damage the switching devices, whilst retaining the benefit of the capacitor 57 allowing rapid initialisation of Mature current at the start of each pulse before the field current can be fully established The provision of the diode 76 enables pulse width modulation to be used However, in order to minimise the snubber voltage whilst controlling sufficient current to guarantee starting, it is necessary for the initial chopping frequency to be reduced It has been found that, even with the initial chopping frequency being reduced to 1.7 kHz and with the initial duty cycle being set to the maximum possible value for acceptable snubber voltages, there are still positions of the rotor close to the aligned position where the motor fails to produce enough starting torque.

This can be resolved by applying the starting technique disclosed in the Applicants'co pending Application No. PCT/GB00/03214.

Figure 11:
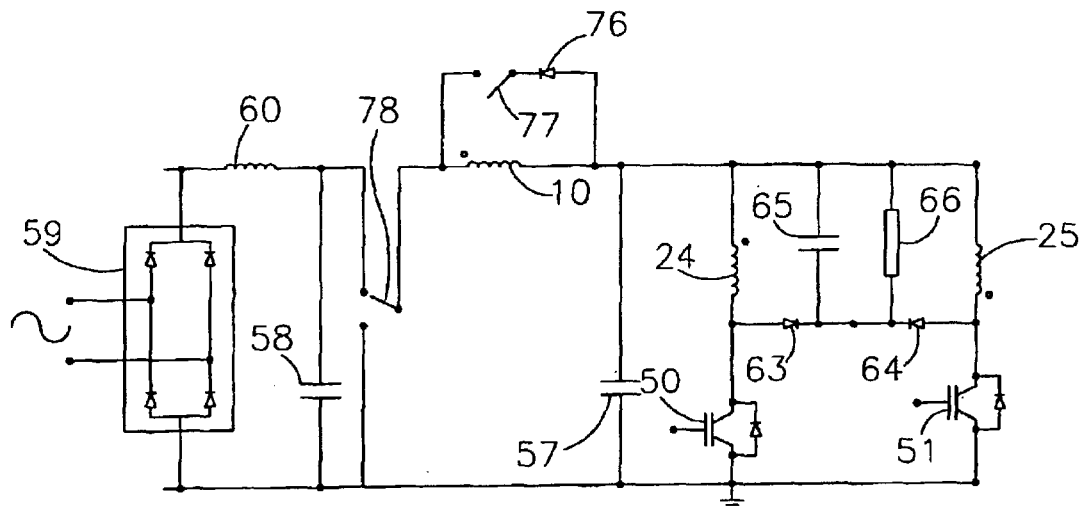

As an alternative to the circuit of FIG. 10, the capacitor 57 may be connected in parallel with the field winding 10 (as in the arrangement of FIG. 7). A diode (as 76 in FIG. 10) can also be added in this arrangement Whilst the provision of the diode 76 in parallel with the field winding 10 in the modification of FIG. 10 permits satisfactory starting of the motor, it has been found that the presence of the diode 76 removes the voltage boosting benefit of the capacitor 57 when the motor is running at high speed, and this in turn reduces the power output of the motor at any given speed (for a particular winding design). Accordingly, in some applications, it may be found advantageous to connect a mechanical switch 77 in series with the diode 76, as shown in FIG. 11, so that the diode 76 can be removed from the circuit once the motor has started. The switch 77 is closed during start-up and acceleration of the motor, but is opened when the motor reaches the desired operating speed. When the motor is to be braked, the switch 77 must be in the open position and an additional switch 78 may be used to connect the field winding 10 to the negative supply rail to enable the field winding 10 to draw current from the capacitor 57, as will be described in more detail below.

Figure 12:
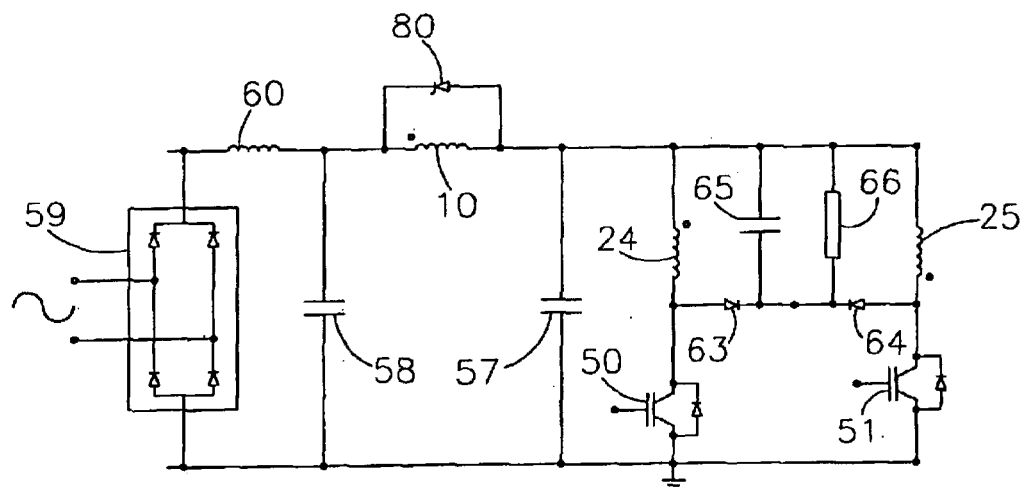

Instead of providing a mechanical switch in series with the diode 76, the diode 76 may be replaced by an electronic switch, such as a thyristor 80, as shown in FIG. 12.

The thyristor 80 is turned on during start-up and acceleration of the motor, but is turned off when the motor reaches the desired operating speed. In this regard commutation of the thyristor 80 will occur naturally when the voltage on the capacitor 57 falls below the voltage on the capacitor 58.

Figure 13:
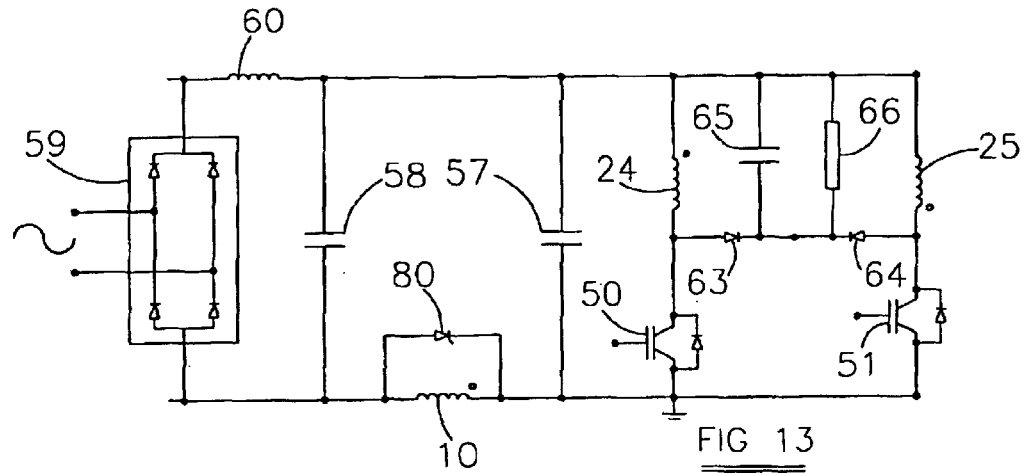

Furthermore FIG. 13 shows an alternative circuit arrangement to that of FIG. 12 in which the field winding 10 is placed in the return leg of the circuit, and the thyristor 80 is referenced to ground potential making the control of the thyristor 80 much simpler because it is referenced to the same supply rail voltage as the armature switches. As before, the thyristor 80 needs to conduct during start-up and acceleration of the motor, but is turned off when the motor reaches no load speed and will remain off during all subsequent loading. In the arrangements of both FIG. 12 and FIG. 13, care needs to be taken to ensure that the thyristor 80 commutates satisfactorily at the required speed, and to ensure that the thyristor 80 is not triggered by any rapid voltage transients. Alternatively the thyristor 80 may be replaced by an IGBT or MOSFET connected in series with a diode to block reverse conduction.

Figure 14:
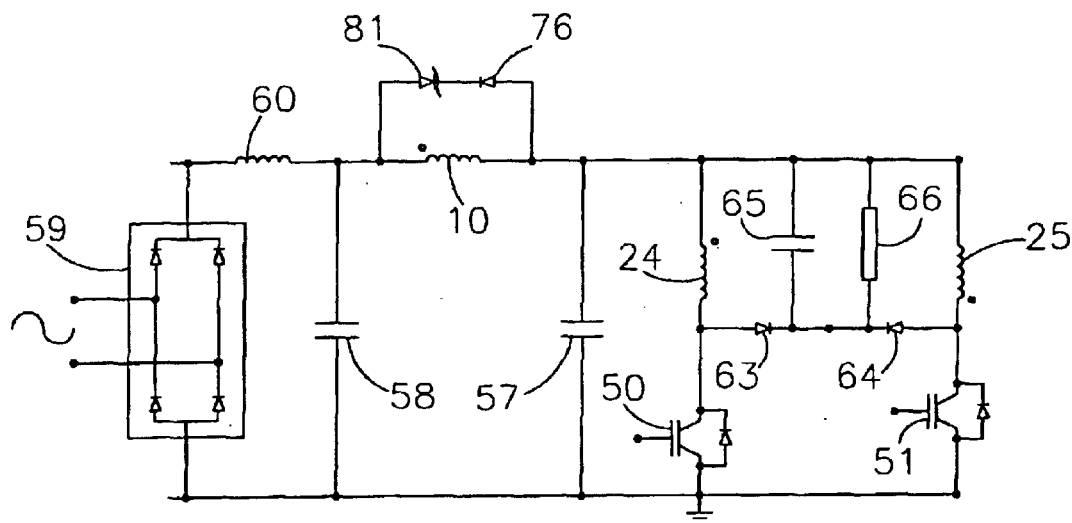
FIGS. 14, 15 and 16 are circuit diagrams showing further circuit arrangements.

FIG. 14 shows a further possible circuit arrangement in which a voltage suppression device 81 in series with the diode 76 is connected in parallel with the field winding 10 to limit the build-up of voltage on the capacitor 57 during start-up of the motor. The voltage suppression device 81 will only conduct if the voltage on the capacitor 57 exceeds the voltage on the capacitor 58 by a predetermined amount and will then prevent the voltage exceeding that amount. The advantage of such a circuit arrangement is that the level of the voltage boosting during start-up and running can be accurately controlled without the need for an additional controlled switch. This has the effect of clamping the voltage once it has increased to the required value, whilst still allowing the capacitor 57 to provide voltage boosting during running.

Figure 15:
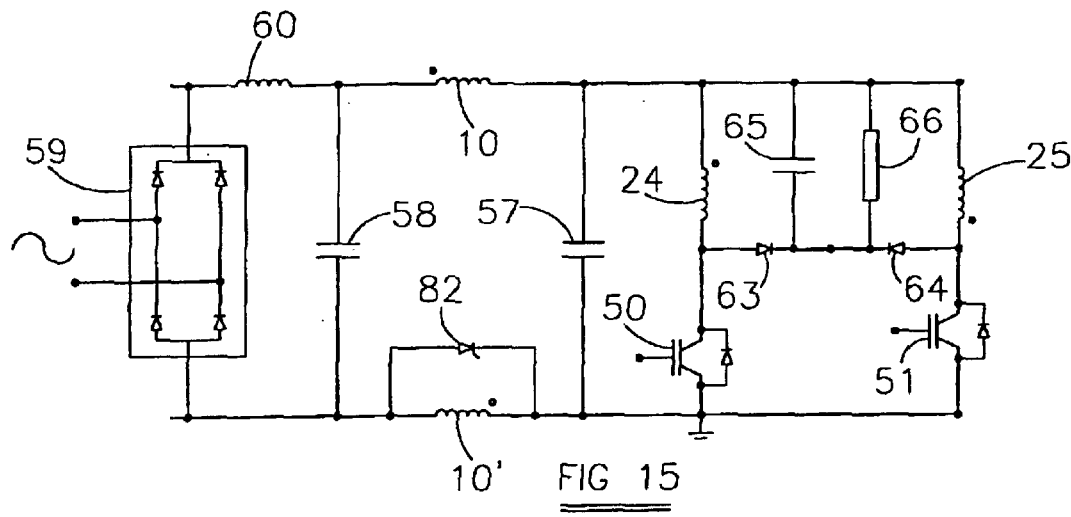

In certain applications it may be advantageous to split the field winding between the positive and negative supply rails in order to improve the inherent filtering provided by the field winding. FIG. 15 shows an arrangement in which field windings 10 and 10' are provided in the positive and negative supply rails. Furthermore a thyristor 82 is connected in parallel with the winding 10'. In this case only one of the windings 10, 10' needs to be switched since, once the thyristor 82 is turned on, the voltage across the winding 10' is controlled, and, by virtue of the close magnetic coupling of the two field windings, this will also control the voltage across the winding 10, thus ensuring that the voltage on the capacitor 57 cannot exceed the voltage on the capacitor 58.

Two methods have been developed for rapidly stopping a flux-switching motor having a series-connected field winding. The first method is intended to be used in the case where power is still available during deceleration of the motor. In this case deceleration is initiated by simultaneously turning on both armature switches, thus drawing a large current through the field winding and allowing the armature current to circulate in a short circuit through the armature switches. The magnitude of the current drawn from the supply may be large in such a case, and a resistor connected in series with the supply can be used to limit the value of the braking current drawn during deceleration. The simultaneous supply of current to both armature coils 24 and 25 and the field winding 10 produces rapid deceleration of the rotor.

Figure 16:
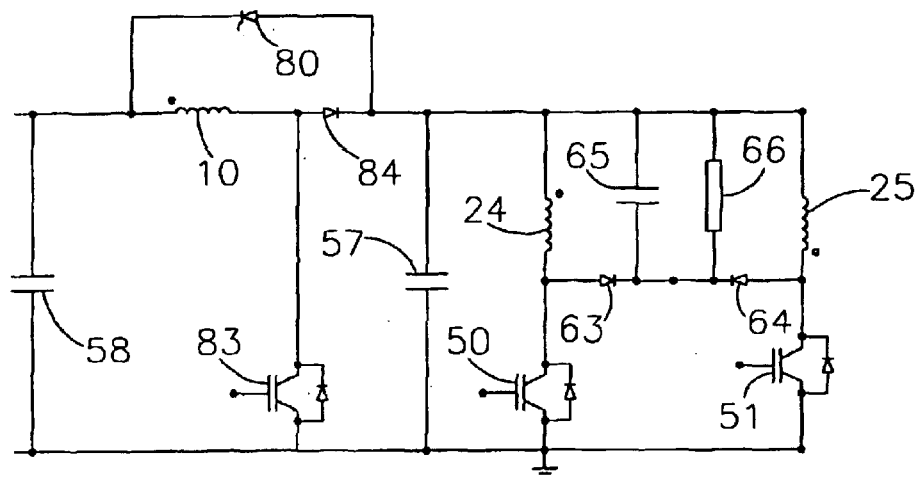

The second method is applicable to the case where no power is available during deceleration, that is where the supply of power to the equipment has been switched off, for example by the power lead becoming accidentally detached. In this case an additional switch, such as the switch 78 in FIG. 11, is required to reconnect the field winding 10 such that it can draw current from the capacitor 57. FIG. 16 shows an appropriate circuit arrangement in which the additional switch is a IGBT 83 (or MOSFET) connected between the end of the field winding 10 and the negative supply rail. If this IGBT 83 is turned on and the thyristor 80 is also turned on, then the current can flow from the capacitor 57 (and also from the capacitor 58 while this is charged) through the field winding 10. This sets up a back emf in the motor windings which forces current to flow out of the armature coils 24, 25 to charge the capacitor 57. The recovered energy supplied to the capacitor 57 in this manner maintains the field current during such regenerative braking even though the power supply may have been disconnected. A diode 84 is required to avoid current flowing directly from the capacitor 57 to the IGBT 83.

The additional switch, constituted by the IGBT 83 in FIG. 16, can be used at other times as an additional control element, and in particular can be used to modulate the level of field current flowing in the field winding so that this is greater than would be drawn naturally by the armature circuit. This additional field current is beneficial in increasing the torque under starting and low load conditions when the power drawn by the armature circuit is small. If the device in parallel with the field winding is a diode, the voltage on the capacitor 57 will never exceed the voltage on the capacitor 58. On the other hand, if the device in parallel with the field winding is a switch, such as a thyristor, then the voltage boosting effect can be restored as required by turning off the switch. There will then be an additional voltage boosting effect due to the boost converter formed by the field winding 10, the IGBT 83 and the diode 84 in combination. Such a boost converter can be used as a power factor correction circuit.

Figure 17:
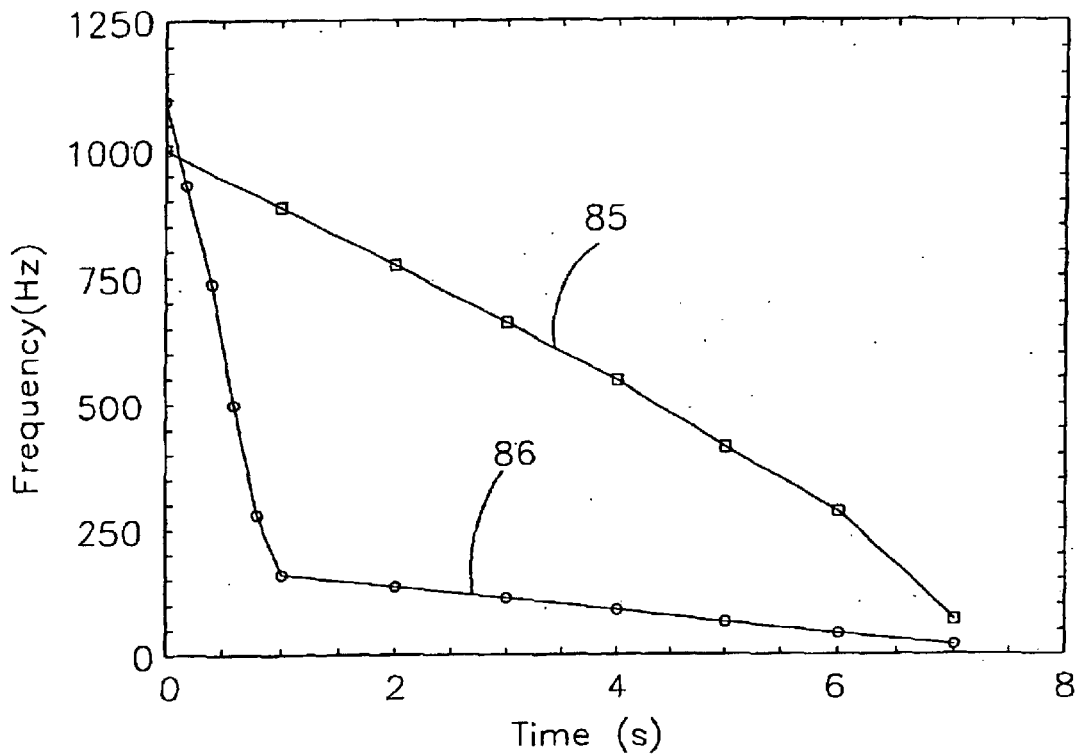
FIG. 17 is a graph of the sensor frequency against time during braking of the motor, showing two different braking operations.

FIG. 17 shows the rate of deceleration of the motor with respect to time, with the speed of the rotor being represented by the output frequency of the position sensor which is, of course, dependent on the rate of rotation of the rotor. Two curves are shown in FIG. 17, namely curve 85 representing deceleration with power still applied to the circuit and with both armature switches conducting simultaneously, and curve 86 representing deceleration without power applied but with recovered energy being supplied to the field winding by turning on of an additional switch 83. It will be seen that in the case of the braking method implemented where no power is supplied, deceleration occurs very rapidly in the first second of braking, and thereafter the motor freewheels to a stop. By contrast, where the supply of power is maintained during braking, substantially linear deceleration of the motor occurs with power being required during the whole of such braking. The rate of deceleration of curve 85 was controlled by a series resistor.

Figure 18:
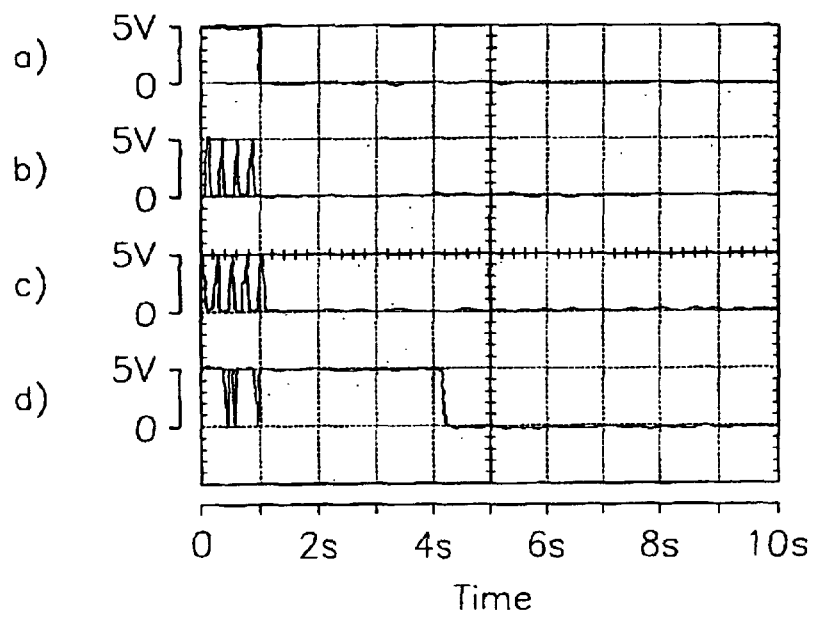
FIG. 18 is a timing diagram showing the switch control signals applied during braking operation.

Braking of a flux switching variable reluctance shunt motor (such as is disclosed in the Applicants' co-pending Application No. PCT/GB00/03197 is achieved in a straightforward manner by switching off both armature switches and supplying current continuously to the field winding by way of the field switch Such a braking sequence is illustrated in the timing diagram of FIG. 18 in which the control signals applied to an on-off switch are shown at a), and the signals at the two armature outputs and the field output of a microcontroller are shown at b), c) and d). Braking begins when the armature switches 50 and 51 are turned off by the control signal going low in response to actuation of the on-off switch. As a result the motor is braked rapidly by the current supplied to the field winding 10, the switch 54 being de-energised at the end of a 3 second braking period to avoid continuous dissipation of heat while the motor is stopped.

What is claimed is:

1. An electrical machine comprising a rotor without windings, a stator having an armature winding and a field winding for generating a magnetomotive force in a direction extending transversely of the magnetomotive force generated by the armature winding and circuit means for controlling the current in the armature winding such that periods in which the magnetomotive force in one direction is associated with a first current pulse alternate with periods in which the magnetomotive force in the opposite direction is associated with a second current pulse, the circuit means incorporating principal terminals and capacitance means including a first capacitance coupled between one of the principal terminals and a circuit point intermediate the field winding and the armature winding, characterized in that the capacitance means further Includes a second capacitance across the principal terminals, the first capacitance having a capacitance value such that the voltage at said circuit point is capable of rising above the voltage across the second capacitance to boost the voltage initializing the armature current at the start of each current pulse.

2. A machine according to claim 1, wherein the armature and field windings are connected in a series configuration.

3. A machine according to claim 1, wherein the armature and field windings are connected in a parallel configuration.

4. A machine according to claim 1, wherein the armature winding comprises armature coils connected to the circuit means such that the currents in the coils vary in synchronism with rotation of the rotor in such a manner that periods in which the magnetomotive force in one direction is associated with current flow in one of the coils alternate with periods in which the magnetomotive force in the opposite direction is associated with current flow in the other coil.

5. A machine according to claim 4, wherein the coils are closely coupled magnetically.

6. A machine according to claim 4, wherein the circuit means comprises respective switch means for alternately conducting first current pulses in one of the armature coils and second current pulses in the other armature coil under the control of the circuit means.

7. An electrical machine comprising a rotor without windings, a stator having an armature winding and a field winding for generating a magnetomotive force in a direction extending transversely of the magnetomotive force generated by the armature winding, and circuit means for controlling the current in the armature winding such that periods in which the magnetomotive tome in one direction is associated with a first current pulse alternate with periods in which the magnetomotive force in the opposite direction is associated with a second current pulse, the circuit means incorporating principal terminals and capacitance means including a first capacitance coupled between one of the principal terminals and an end of the armature winding, characterized in that the capacitance means further includes a second capacitance across the principal terminals, the first capacitance having a capacitance value such that the voltage at said end of the armature winding is capable of rising above the voltage across the second capacitance to boost the voltage initializing the armature current at the start of each current pulse, wherein the field magnet means comprises a field winding wound on the stator, and the first capacitance is coupled in parallel with the field winding.

8. A machine according to claim 1, wherein the second capacitance has a substantially larger capacitance value then the first capacitance.

9. A machine according to claim 1, which includes rectifying means to limit the voltage applied to the armature winding in operation.

10. A machine according to claim 9, wherein the rectifying means is connected in parallel with the field winding to prevent the voltage across the first capacitance from rising substantially above the voltage across the principal terminals, at least during starting of the machine.

11. An electrical machine comprising a rotor without windings, a stator having an armature winding and field magnet means for generating a magnetomotive force in a direction extending transversely of the magnetomotive force generated by the armature winding, and circuit means for controlling the current in the armature winding such that periods in which the magnetomotive force in one direction is associated with a first current pulse alternate with periods in which the magnetomotive force in the opposite direction is associated with a second current pulse, the circuit means incorporating principal terminals and capacitance means including a first capacitance coupled between one of the principal terminals and an end of the armature winding, characterized in that the capacitance means further includes a second capacitance across the principal terminals having a substantially larger capacitance value than the first capacitance, the first capacitance having a capacitance value such that the voltage at said end of the armature winding is capable of rising above the voltage across the second capacitance to boost the voltage initializing the armature current at the start of each current pulse, which includes rectifying means to limit the voltage applied to the armature winding in operation, wherein the rectifying means is connected in parallel with the field winding to prevent the voltage across the first capacitance from rising substantially above the voltage across the principal terminals at least during starting of the machine, and wherein the rectifying means incorporates a mechanical switch.

12. An electrical machine comprising a rotor without windings, a stator having an armature winding and field magnet means for generating a magnetomotive force in a direction extending transversely of the magnetomotive force generated by the armature winding, and circuit means for controlling the current in the armature winding such that periods in which the magnetomotive force in one direction is associated with a first current pulse alternate with periods in which the magnetomotive force in the opposite direction is associated with a second current pulse, the circuit means incorporating principal terminals and capacitance means including a first capacitance coupled between one of the principal terminals and an end of the armature winding, characterized in that the capacitance means further includes a second capacitance across the principal terminals, the first capacitance having a capacitance value such that the voltage at said end of the armature winding is capable of rising above the voltage across the second capacitance to boost the voltage initializing the armature current at the start of each current pulse, which includes rectifying means to limit the voltage applied to the armature winding in operation, wherein the rectifying means is connected in parallel with the field winding to prevent the voltage across the first capacitance from rising substantially above the voltage across the principal terminals at least during starting of the machine and wherein the rectifying means comprises electronic switching means adapted to limit the voltage across the first capacitance selectively during starting.

13. An electrical machine comprising a rotor without windings, a stator having an armature winding and field magnet means for generating a magnetomotive force in a direction extending transversely of the magnetomotive force generated by the armature winding, and circuit means for controlling the current in the armature winding such that periods in which the magnetomotive force in one direction is associated with a first current pulse alternate with periods in which the magnetomotive force in the opposite direction is associated with a second current pulse, the circuit means incorporating principal terminals and capacitance means including a first capacitance coupled between one of the principal terminals and an end of the armature winding, characterized in that the capacitance means further includes a second capacitance across the principal terminals, the first capacitance having a capacitance value such that the voltage at said end of the armature winding is capable of rising above the voltage across the second capacitance to boost the voltage initializing the armature current at the start of each current pulse which includes rectifying means to limit the voltage applied to the armature winding in operation, wherein the rectifying means is connected in parallel with the field winding to prevent the voltage across the first capacitance from rising substantially above the voltage across the principal terminals, at least during starting of the machine and wherein the rectifying means comprises electronic switching means adapted to limit the voltage across the first capacitance selectively during starting and the electronic switching means is a voltage suppression device which prevents the voltage across the first capacitance from rising above the voltage across the second capacitance by more than a predetermined amount.

14. An electrical machine comprising a rotor without windings, a stator having an armature winding and a field winding for generating a magnetomotive force in a direction extending transversely of the magnetomotive force generated by the armature winding, and circuit means for controlling the current in the armature winding such that periods in which the magnetomotive force in one direction is associated with a first current pulse alternate with periods in which the a magnetomotive force in the opposite direction is associated with a second current pulse, the circuit means incorporating principal terminals and capacitance means including a first capacitance coupled between one of the principal terminals and a circuit point intermediate the field winding and the armature winding, characterized in that the capacitance means further includes a second capacitance across the principal terminals, the first capacitance having a capacitance value such that the voltage at said circuit point is capable of rising above the voltage across the second capacitance to boost the voltage initializing the armature current at the start of each current pulse, wherein the circuit means is arranged to be charged with energy recovered from the armature winding and to supply the recovered energy to the field winding to brake the rotor when the machine is to be stopped under conditions in which there is no power supplied to the circuit means from an external source.

15. A machine according to claim 14, wherein switching means is provided to connect the field winding to ground during such braking.

16. An electrical machine comprising a rotor without windings, a stator having an armature winding and a field winding for generating a magnetomotive force in a direction extending transversely of the magnetomotive force generated by the armature winding, and circuit means for controlling the currents in the armature winding and the field winding such that periods in which the magnetomotive force in one direction is associated with a first current pulse alternate with periods in which the magnetomotive force in the opposite direction is associated with a second current pulse the circuit means incorporating capacitance means, characterized in that the circuit means is arranged to be charged with energy recovered from the armature winding and to supply the recovered energy to the field winding to brake the rotor when the machine is to be sped under conditions in which there is no power supplied to the circuit means from an external source, wherein switching means is provided to connect the field winding to ground during such braking.

17. An electrical machine comprising a rotor without windings, a stator having an armature winding and a field winding for generating e magnetomotive force in a direction extending transversely of the magnetomotive force generated by the armature winding, and circuit means for controlling the currents in the armature winding and the field winding such that periods in which the magnetomotive force in one direction is associated with a first current pulse alternate with periods in which the magnetomotive force in the opposite direction is associated with a second current pulse, characterized by control means for supplying control signals to the circuit means to control the currents in the armature winding and the field winding, the control means being arranged to produce control signals, during braking of the rotor cycles whilst maintaining current in the field winding.

* * * * *